Oct. 26, 1965   L. R. GORELOV ETAL   3,213,990
CLUTCH BEARING ADJUSTING DEVICE
Filed Aug. 27, 1963

3,213,990
CLUTCH BEARING ADJUSTING DEVICE
Leonid Rafailovich Gorelov and Mikhail Alexandrovich Shimanko, both of Moscow, U.S.S.R., assignors to Moscowsky Zavod Malolitrazhnykh Avtomobilei
Filed Aug. 27, 1963, Ser. No. 304,793
2 Claims. (Cl. 192—110)

The invention relates to a hydraulic drive for an automobile clutch, and more particularly to means for adjusting the clearance between the release bearing and the components of the clutch release mechanism.

It is well known that the normal functioning of an automobile clutch depends materially upon a properly adjusted clearance between the release bearing and the parts of the clutch release levers. More specifically, if the clearance is too small, this causes slipping of the clutch and wear of the friction linings and release bearing. On the other hand an excessively large clearance results in incomplete disengagement of the clutch thereby causing rapid wear of the synchronizer rings and possibly leading to breaking of the transmission gear teeth. The size of this clearance can be determined by measuring the free travel of the clutch pedal. However, the use of a clutch hydraulic control prevents this clearance from being determined on the basis of the pedal free travel.

An object of the present invention is to provide a clearance adjusting means which is not subject to the aforementioned drawback and which facilitates the adjustment of the clearance between the release bearing and the components of the clutch release mechanism of the motor vehicle.

To achieve the foregoing and other objects, the tip of the pusher is defined by a fork-like member with each arm of the member being provided with an elonngated slot in which is lodged a pin rigidly connected to the release fork of the clutch and a threaded joint means interconnecting the tip and shank permits the adjustment of the clearance. The invention permits the clearance to be determined and adjusted without preliminary measurements.

Figure 2:
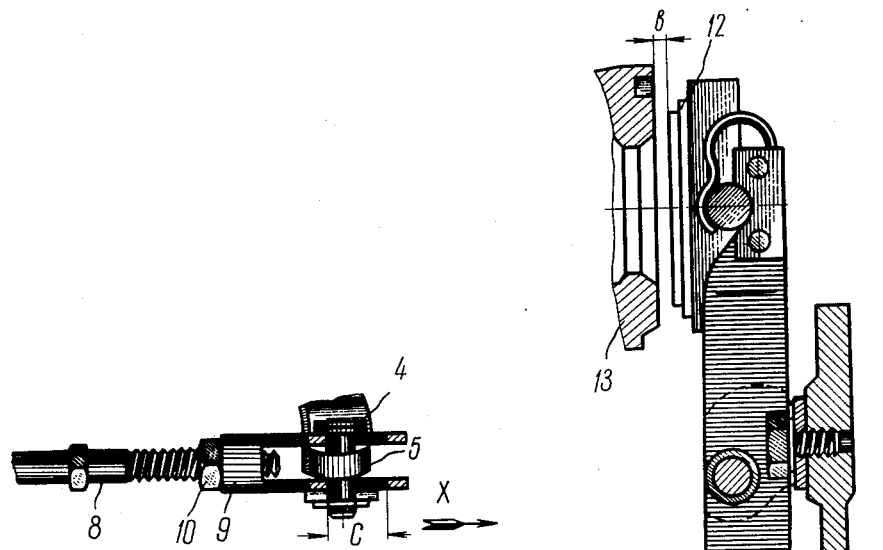
Figure 1:
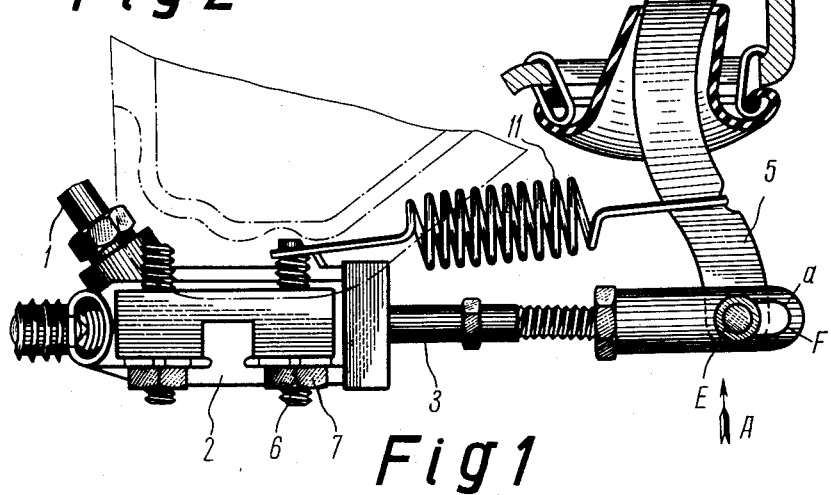

Further objects and advantages of the invention will become more readily apparent to persons skilled in the art from the following detailed description and annexed drawings, and in which drawings:

FIG. 1 is a diagrammatic view partly in elevation and partly in cross-section of the automobile clutch hydraulic control arrangement, and FIG. 2 is a fragmentary view looking in the direction of the arrow A in FIG. 1.

The action is transmitted from the pedal to the master cylinder piston (not shown) and by the brake fluid through a pipe 1 to an operating cylinder piston assembly 2, and a pusher device 3, to a clutch release fork 5.

The cylinder piston assembly 2 is secured by means of studs 6 and nuts 7 to the clutch housing. The pusher device 3 consists of a shank 8, a forked tip 9 and a locknut 10. The length of the pusher can be changed by the use of a threaded joint 8a between the shank 8 and tip 9 on which the nut 10 is threaded.

Each arm 9a of the forked tip 9 is provided with an elongated slot a for the reception of a pin 4 located in the cylindrical hole of the release fork 5. The pin 4 is constantly pressed by a spring 11 through the fork 5 against front radius surface E of the slot a.

To adjust clearance b between a release bearing 13 and clutch release lever parts 12, it is necessary to remove the spring 11 from clutch release fork 5 with the other end of the spring remaining secured to the body of cylinder piston assembly 2.

The length c of the slot a is selected so that the movement of the pin 4 with the release fork 5 relative to the tip 9 from the radius surface E to the moment when the pin 4 bears against rear radius surface F of the slot a, corresponds to the required size of the clearance b between the release bearing 13 and the release lever parts 12.

The clearance b is adjusted as follows: if the pin 4 with the fork 5, moved in the direction of arrow X, are stopped before the pin 4 reaches the rear surface F of the slot a it means that the clearance b between the release bearing 13 and release lever parts 12 is too small. In this case, correct clearance will be set by loosening the locknut 10 and rotating the shank 8 to reduce the length of pusher 3 until the surface F of the slot a comes into contact with the pin 4.

If movement of the fork 5 with the pin 4 is limited when the latter is stopped by the surface F of the slot a in the tip 9 it means that the release bearing 13 is too far from thrust surface d of the release lever parts 12 and that the clearance b is too large. To reduce the clearance, it is also necessary to loosen the locknut 10 and rotate the shank 8 to lengthen the pusher until a clearance is ensured between the pin 4 and the surface F when the fork 5 with the pin 4 are moved. The length of the pusher 3 is then reduced until surface F of the slot a comes into contact with the pin 4.

As pointed out above, the design of this device allows the clearance between the release bearing and the thrust surface of the clutch release levers to be adjusted without preliminary measurements.

The invention is not to be confined to any strict conformity to the showings in the drawings but changes and modifications may be made therein so long as such changes or modifications mark no material departure from the spirit and scope of the appended claims.

What we claim is:

1. In a hydraulic clutch system for automobiles of the type having a cylinder piston assembly, a release bearing and clutch release mechanism including a clutch release fork and means for adjusting the clearance between the release bearing and the clutch release mechanism, said adjusting means comprising a pusher operably connected to the piston of said assembly, said pusher having a shank, a forked tip and a threaded connection between the shank and tip whereby the length of said pusher can be adjusted, each arm of the forked tip having an elongated slot with front and rear radius surfaces, the release fork being located between the arms of the forked tip, a pin rigidly secured to the clutch release fork and positioned in said slots, and spring means connected to the clutch release fork and cylinder piston assembly normally holding the pin in contact with the front radius surface of the slots with the length of the slots being such that the movement of the pin with the clutch release fork relative to the tip from the front radius surface to the time when the pin bears against the rear radius surface corresponds to the required clearance between the release bearing and the clutch release mechanism.

2. The hydraulic clutch system as claimed in claim 1 including a lock nut on said threaded connection for maintaining the pusher in its adjusted position.

References Cited by the Examiner
UNITED STATES PATENTS

| | | |
|---|---|---|
| 1,016,052 | 1/12 | Webb. |
| 2,161,670 | 6/39 | Freeman et al. |
| 2,167,118 | 7/39 | Lanser. |
| 2,247,463 | 7/41 | Allison. |
| 2,367,076 | 1/45 | Varblow. |

DAVID J. WILLIAMOWSKY, *Primary Examiner.*